US012627351B2

(12) United States Patent
Cheng et al.

(10) Patent No.: US 12,627,351 B2
(45) Date of Patent: May 12, 2026

(54) MIMO JOINT ToA AND AoA ESTIMATION FOR Wi-Fi SYSTEMS

(71) Applicant: MediaTek Inc., Hsinchu City (TW)

(72) Inventors: Ching-Chia Cheng, Hsinchu City (TW); Yen-Wen Yang, Hsinchu City (TW)

(73) Assignee: MediaTek Inc., Hsinchu City (TW)

( * ) Notice: Subject to any disclaimer, the term of this patent is extended or adjusted under 35 U.S.C. 154(b) by 288 days.

(21) Appl. No.: 18/521,416

(22) Filed: Nov. 28, 2023

(65) Prior Publication Data

US 2024/0187068 A1     Jun. 6, 2024

Related U.S. Application Data

(60) Provisional application No. 63/385,637, filed on Dec. 1, 2022.

(51) Int. Cl.
 *H04B 7/06*     (2006.01)
 *H04B 7/08*     (2006.01)
 *H04B 17/318*     (2015.01)
 *H04B 17/336*     (2015.01)

(52) U.S. Cl.
 CPC ........... *H04B 7/0626* (2013.01); *H04B 7/086* (2013.01); *H04B 17/328* (2023.05); *H04B 17/336* (2015.01)

(58) Field of Classification Search
 CPC .. H04B 7/0626; H04B 17/336; H04B 17/328; H04B 7/086
 USPC ......................................................... 370/329
 See application file for complete search history.

(56) References Cited

U.S. PATENT DOCUMENTS

| | | | | |
|---|---|---|---|---|
| 2010/0157810 A1* | 6/2010 | Oh | ......................... | G01S 13/767 370/241 |
| 2010/0172339 A1* | 7/2010 | Duan | .................... | G01S 13/765 370/350 |
| 2011/0064152 A1* | 3/2011 | Okino | .................. | H04B 7/0413 375/260 |
| 2011/0195701 A1* | 8/2011 | Cook | .................... | G01S 5/0018 455/422.1 |
| 2024/0196361 A1* | 6/2024 | Singh | .................... | G01S 5/0036 |

\* cited by examiner

*Primary Examiner* — Faruk Hamza
*Assistant Examiner* — Jean F Voltaire
(74) *Attorney, Agent, or Firm* — Andy M. Han; Han IP PLLC

(57) ABSTRACT

Techniques pertaining to multiple-input-multiple-output (MIMO) joint time of arrival (ToA) and angle of arrival (AoA) for Wi-Fi systems in wireless communications are described. An apparatus performs channel estimation to obtain a plurality of multiple-input-multiple-output (MIMO) channel state information (CSI). The apparatus then calculates weighted MIMO CSI and determines a time of arrival (ToA) or the ToA and an angle of arrival (AoA) based at least on the weighted MIMO CSI.

15 Claims, 6 Drawing Sheets

STA
120

STA
110

RANGING WITH MULTI-INPUT-MULTIPLE-OUTPUT (MIMO) JOINT TIME OF ARRIVAL
(TOA) AND ANGLE OF ARRIVAL (AOA) ESTIMATION

100

600

PERFORM, BY THE A PROCESSOR OF AN APPARATUS, CHANNEL ESTIMATION TO OBTAIN A PLURALITY OF MULTIPLE-INPUT-MULTIPLE-OUTPUT (MIMO) CHANNEL STATE INFORMATION (CSI)

610

CALCULATE, BY THE PROCESSOR, WEIGHTED MIMO CSI

620

DETERMINE, BY THE PROCESSOR, A TIME OF ARRIVAL (ToA) OR THE ToA AND AN ANGLE OF ARRIVAL (AoA) BASED AT LEAST ON THE WEIGHTED MIMO CSI

630

MIMO JOINT ToA AND AoA ESTIMATION FOR Wi-Fi SYSTEMS

CROSS REFERENCE TO RELATED PATENT APPLICATION

The present disclosure is part of a non-provisional patent application claiming the priority benefit of U.S. Provisional Patent Application No. 63/385,637, filed 1 Dec. 2022, the content of which being herein incorporated by reference in its entirety.

TECHNICAL FIELD

The present disclosure is generally related to wireless communications and, more particularly, to multiple-input-multiple-output (MIMO) joint time of arrival (ToA) and angle of arrival (AoA) for Wi-Fi systems in wireless communications.

BACKGROUND

Unless otherwise indicated herein, approaches described in this section are not prior art to the claims listed below and are not admitted as prior art by inclusion in this section.

In wireless communications such as Wi-Fi (or WiFi) and wireless local area networks (WLANs) in accordance with upcoming Institute of Electrical and Electronics Engineers (IEEE) 802.11 standard(s), devices compliant with IEEE 802.11mc and IEEE 802.11az are allowed to measure the distance to a nearby access point (AP) through a two-way ranging technology. To achieve the two-way ranging, both the AP and the device (e.g., station (STA)) need to estimate the ToA. Typically, the device can obtain trilateration of its location with three or more APs. On the other hand, with AoA, the device would be able to calculate its location with a single AP.

In indoor environments, there tend to be many clusters that cause reflection paths between the device and the AP. In order to determine or obtain information of the device's accurate location, a channel impulse response (CIR) needs to be extracted from a receiver (Rx) channel state information (CSI) with estimation of only the ToA and AoA of a headmost path. However, the perfect CIR extraction is difficult for Wi-Fi systems in a dense environment, since the Wi-Fi channel bandwidth is only up to 160 MHz such that timing difference of less than 6.25 nanoseconds (ns) between any two paths would create a fake path in CSI and thus would be difficult to separate. For example, for 160 MHz, the time resolution=1/channel bandwidth=6.25 ns, and range resolution=C*time resolution=3*108 m/s*6.25 ns=1.875 m. To enhance accuracy, there are two approaches. One approach involves MIMO channel joint search in that the same ToA and AoA are contained in the CSI of all transmit (Tx) and receive (Rx) pairs. Another approach involves maintaining possibilities that found paths are fake paths created by nearby true paths. Nevertheless, there is still room for improvement in the quality of channel estimation and enhancement in ToA and AoA accuracy. Therefore, there is a need for a solution of MIMO joint ToA and AoA for Wi-Fi systems.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to MIMO joint ToA and AoA for Wi-Fi systems in wireless communications. It is believed that the aforementioned issue(s) may be avoided or otherwise alleviated by implementation of one or more of the various proposed schemes described herein.

In one aspect, a method may involve performing channel estimation to obtain a plurality of MIMO CSI. The method may also involve calculating weighted MIMO CSI. The method may further involve determining a ToA or the ToA and a AoA based at least on the weighted MIMO CSI.

In another aspect, an apparatus may include a transceiver configured to communicate wirelessly and a processor coupled to the transceiver. The processor may perform channel estimation to obtain a plurality of MIMO CSI. The processor may also calculate weighted MIMO CSI. The processor may further determine a ToA or the ToA and an AoA based at least on the weighted MIMO CSI.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It would be appreciated that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to MIMO joint ToA and AoA for Wi-Fi systems in wireless communications. According to the present disclosure, a number of possible solutions may be implemented separately or jointly. That is, although these possible solutions may be described below separately, two or more of these possible solutions may be implemented in one combination or another.

Figure 1:
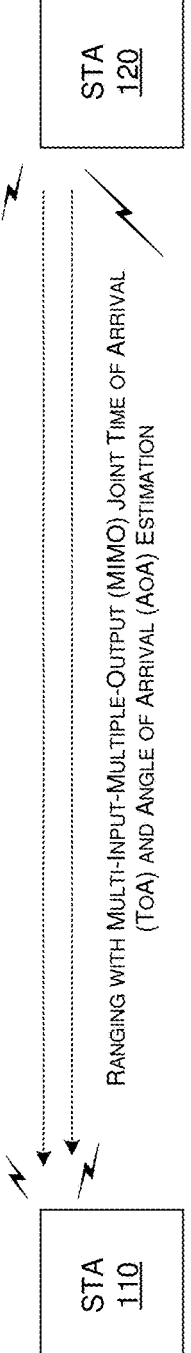
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 6 illustrate examples of implementation of various proposed schemes in network environment 100 in accordance with the present disclosure. The following description of various proposed schemes is provided with reference to FIG. 1~FIG. 6.

Referring to FIG. 1, network environment 100 may involve at least a STA 110 communicating wirelessly with a STA 120. Either of STA 110 and STA 120 may be an AP STA or, alternatively, either of STA 110 and STA 120 may function as a non-AP STA. STA 110 and STA 120 may be configured or otherwise capable of operating in accordance with the same or different IEEE 802.11 standard(s) (e.g., Wi-Fi 7 and Wi-Fi 8 as well as future-developed standards). Each of STA 110 and STA 120 may be configured to communicate with each other by utilizing the techniques pertaining to MIMO joint ToA and AoA for Wi-Fi systems in wireless communications in accordance with various proposed schemes described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

Under various proposed schemes in accordance with the present disclosure, MIMO CSI may be utilized to provide more diversity than single-input-single-output (SISO) CSI, thereby enhancing ToA and AoA estimation accuracy. Under the proposed schemes, as each CSI may have different signal-to-interference-and-noise ratio (SINR) and received signal strength indicator (RSSI), different weighting factors may be applied depending on the RSSI, SINR and root-mean-square deviation (RMSD). It is notable that maximum ratio combining (MRC), which is based on signal-to-noise ratio (SNR) alone, may not be the best combining scheme for ToA and AoA, as the accuracy of ToA and AoA may be primarily dependent on multipath rather than sensitivity to SNR. Under the proposed schemes, with the same SNR threshold, a given CSI with a respective SINR lower than the SNR threshold may be de-weighted, while a predetermined (same) weight may be applied for another CSI with a respective SINR equal to or higher than the SNR threshold. For instance, a CSI with a respective SINR lower than a SNR threshold of 16 dB may be de-weighted, while other CSI with respective SINRs higher than 16 dB may have the same predetermined weighting factor applied. Under the proposed schemes, a large bandwidth (e.g., 160 MHZ) may be utilized to provide more diversity than a narrow bandwidth (e.g., 20 MHz) to enhance the estimation accuracy of ToA and AoA. Moreover, as each subcarrier/subband may have different SINRs, dynamic masking may be utilized depending on SINR and noise profile. For instance, one or more subcarriers/subbands with worse SINR (e.g., lower than a SINR threshold, which may be due to interference from Bluetooth and/or other source(s)) may be dynamically disregarded. Additionally, ToA and AoA may be searched from weighted MIMO CSI combines, and channel impulse response may be iteratively extracted from MIMO CSI to search ToA and AoA. For instance, each iteration may start with greater than or equal to one ($\geq 1$) candidate. In an event of a given candidate search $\geq 1$ new possible tap candidate, individually each of the new possible tap component(s) may be canceled. At the end of each iteration, one or more of the most possible candidate(s) may be kept for the next iteration, and a determination may be made as to whether any candidate passes termination criteria or not.

Figure 2:
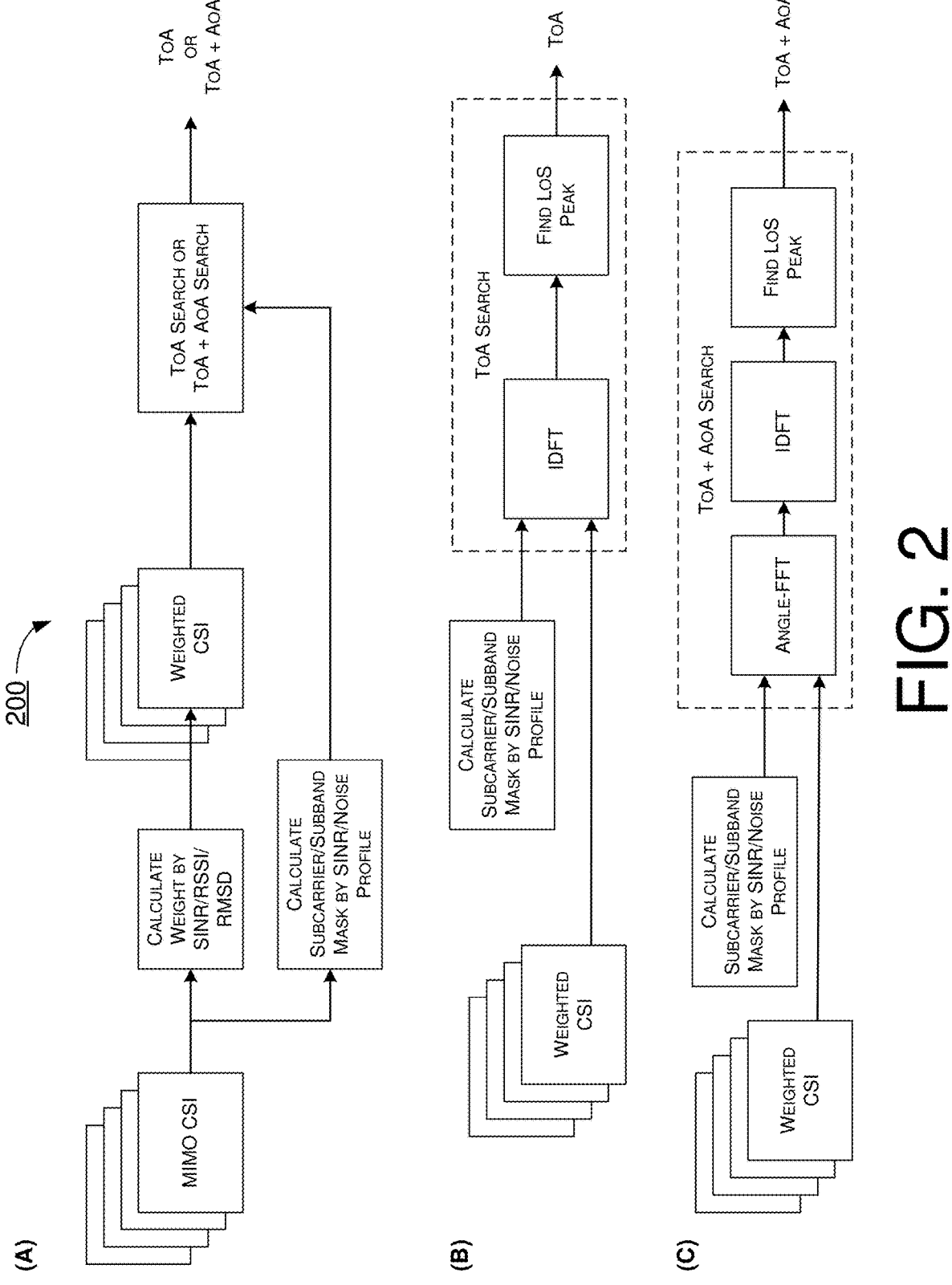
FIG. 2 is a diagram of an example design under a proposed scheme in accordance with the present disclosure.

FIG. 2 illustrates an example design 200 under a proposed scheme in accordance with the present disclosure. Part (A) of FIG. 2 may pertain to an example of MIMO joint ToA and AoA estimation. Part (B) of FIG. 2 may pertain to an example of ToA search with weighted MIMO CSI as one portion of that shown in part (A) under one approach (e.g., ToA search). Part (C) of FIG. 2 may pertain to an example of ToA and AoA search with weighted MIMO CSI in a uniform linear array (ULA) as one portion of that shown in part (A) under another approach (e.g., ToA+AoA search).

Referring to part (A) of FIG. 2, with respect to MIMO joint ToA and AoA estimation, a device may receive or otherwise obtain a plurality of sets of MIMO CSI from channel estimation and, for each set of MIMO CSI, the device may calculate a respective weight (or respective weighting factor) based on the associated SINR, RSSI and/or RMSD. Then, by multiplying each set of MIMO CSI with its respective weight (or weighting factor), the device may obtain a plurality of sets of weighted CSI. Additionally, for each subcarrier/subband, the device may calculate a respective subcarrier/subband validation mask, based on a respective SINR and/or noise profile associated with that subcarrier/subband, to obtain one or more subcarrier/subband validation masks. Furthermore, the device may utilize a search engine to perform a ToA search (or a ToA plus AoA search) to obtain a ToA (or both ToA and AoA) using the plurality of sets of weighted CSI as well as the one or more subcarrier/subband validation masks.

Referring to part (B) of FIG. 2, with respect to ToA search using the weighted MIMO CSI and the one or more subcarrier/subband validation masks as inputs, an inverse Discrete Fourier Transform (IDFT) operation may be performed on the plurality of sets of weighted CSI, and an output of the IDFT operation may be utilized to find a line of sight (LOS) peak so as to obtain a ToA.

Referring to part (C) of FIG. 2, with respect to ToA plus AoA search using the weighted MIMO CSI in ULA and the one or more subcarrier/subband validation masks as inputs, an angle Fast Fourier Transform (angle-FFT) operation, followed by an IDFT operation, may be performed on the plurality of sets of weighted CSI, and an output of the IDFT operation may be utilized to find a LOS peak so as to obtain a ToA and an AoA.

Figure 3:
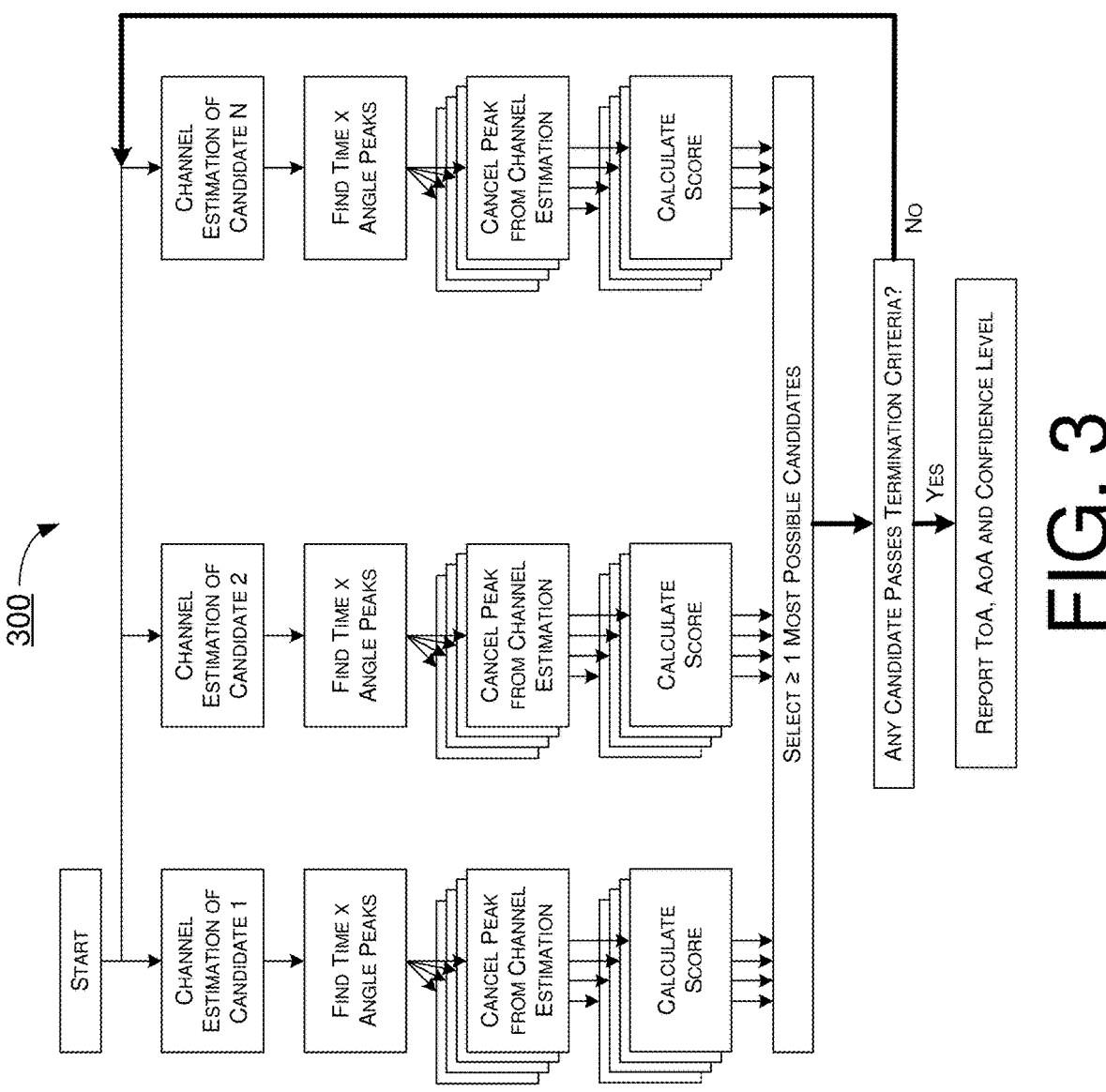
FIG. 3 is a diagram of an example design under a proposed scheme in accordance with the present disclosure.

FIG. 3 illustrates an example design 300 under a proposed scheme in accordance with the present disclosure. Design 300 may involve a ToA and AoA search tree used in searching for the ToA and AoA from weighted MIMO CSI combines. Referring to FIG. 3, for each of N candidates (N≥1), channel estimation may be performed between a pair of devices (e.g., a STA and an AP) to obtain MIMO CSI, from which CIR may be extracted iteratively. In each iteration, one or more new possible tap candidates may be searched and new possible tap component(s) (e.g., LoS peak(s)) may be canceled individually. At the end of each iteration, one or more most possible candidates may be kept for the next iteration. Finally, a determination regarding whether any ToA/AoA candidate passes termination criteria. If the result is "yet", then the ToA candidate and AoA candidate passing the termination criteria, as well as a respective confidence level associated therewith, may be identified and reported. The identified ToA and AoA may then be utilized in performing two-way ranging between the pair of devices.

Figure 4:
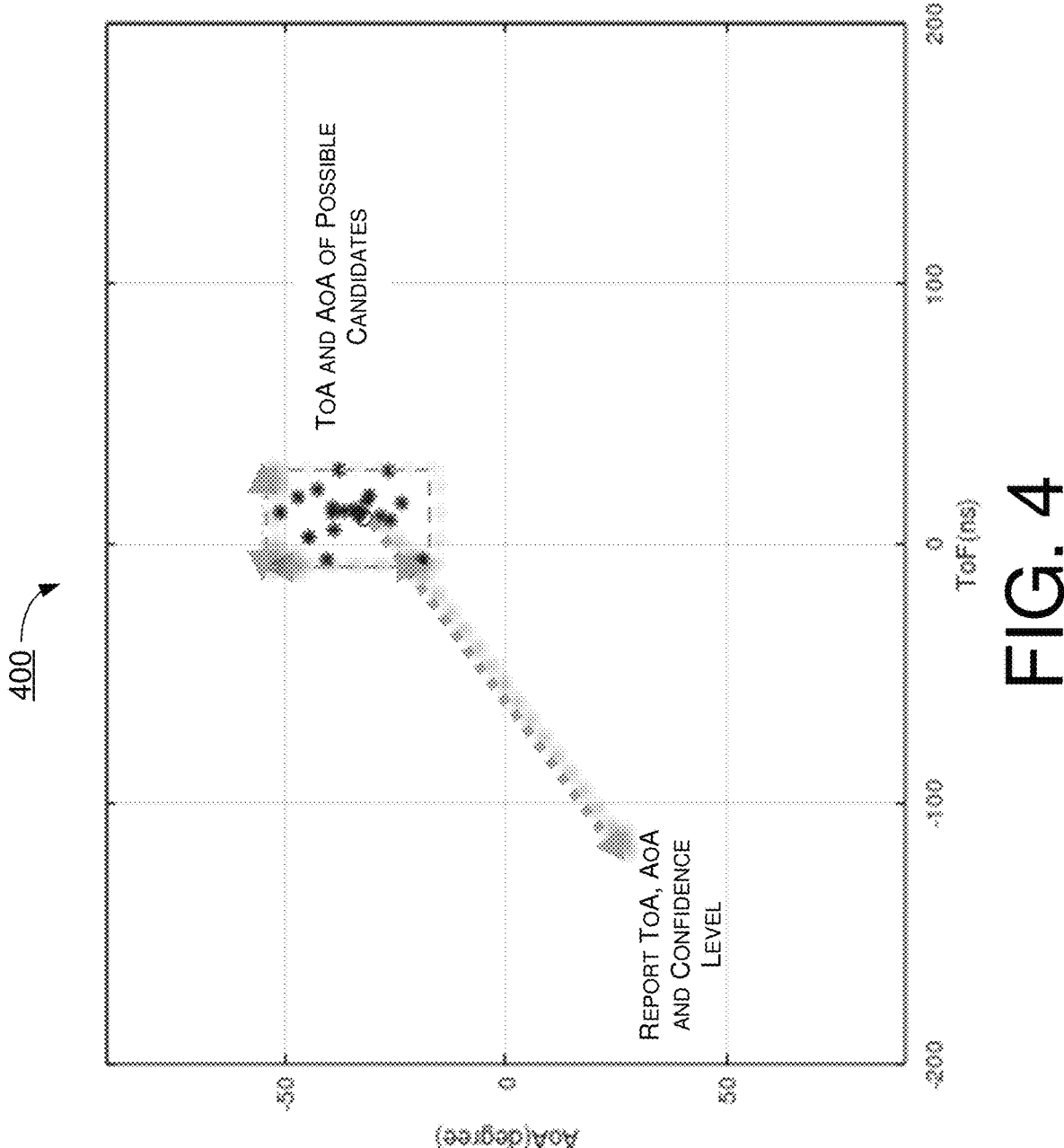
FIG. 4 is a diagram of an example scenario under a proposed scheme in accordance with the present disclosure.

FIG. 4 illustrates an example scenario 400 under a proposed scheme in accordance with the present disclosure. Scenario 400 may pertain to an example of simulation result. Based on results from simulations of the proposed schemes, it may be seen that combining all MIMO pairs may provide spatial diversity and avoid some headmost tap deep fade problem. Additionally, MIMO multipath may enhance resolution problem and provide a confidence level.

In view of the above, it is believed that one of ordinary skill in the art would appreciate the benefits provided by implementation of one or more of the proposed schemes. For instance, robustness may be achieved by implementation of one or more of the proposed schemes, as eigenvalue-based algorithm may provide good estimation of reflection path numbers. Moreover, accuracy in estimation may be improved. For instance, results of simulation of one or more of the proposed schemes showed an enhancement of ToA and AoA estimation accuracy (e.g., 30% for ToA and 100% for AoA).

Illustrative Implementations

Figure 5:
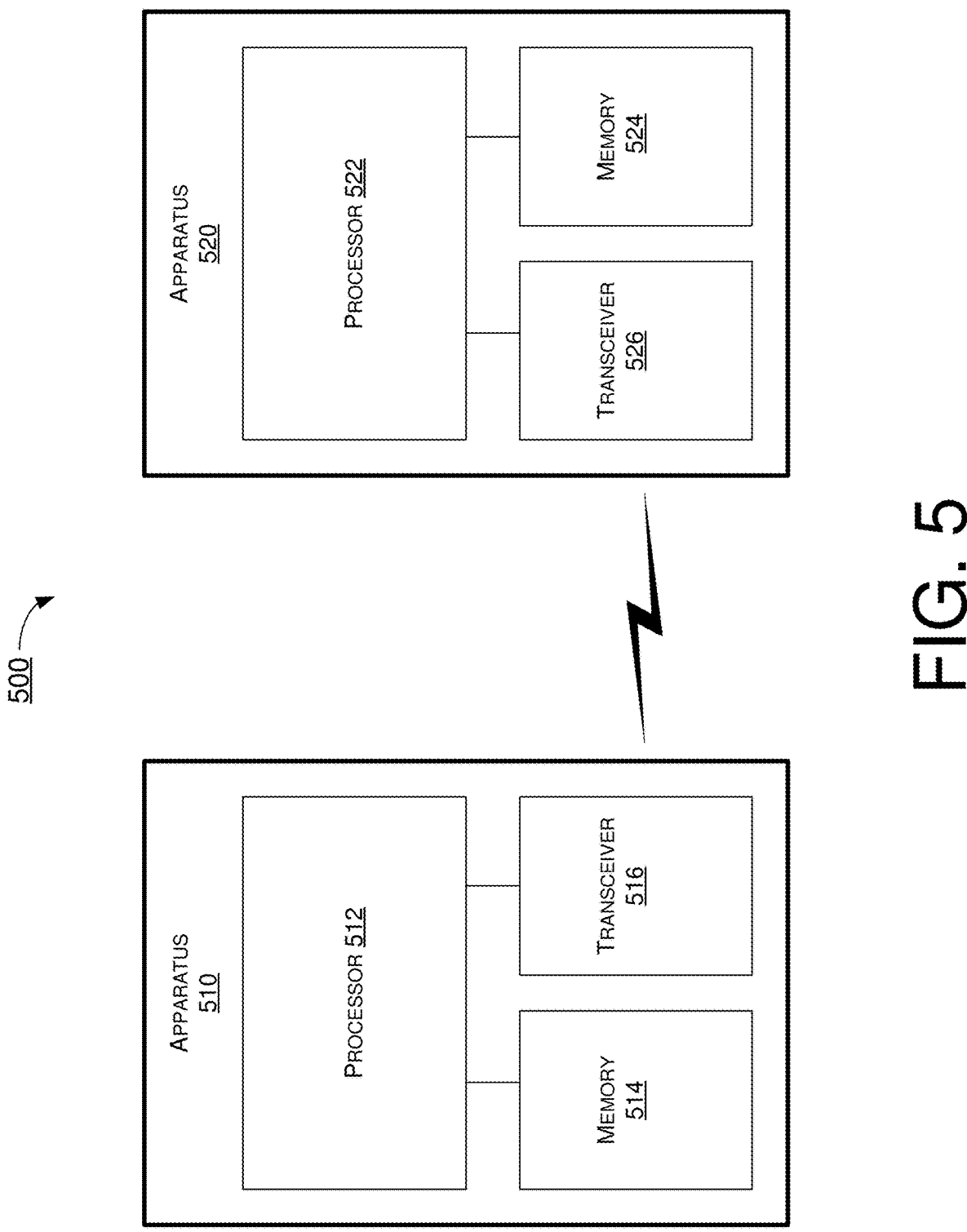
FIG. 5 is a block diagram of an example communication system in accordance with an implementation of the present disclosure.

FIG. 5 illustrates an example system 500 having at least an example apparatus 510 and an example apparatus 520 in accordance with an implementation of the present disclosure. Each of apparatus 510 and apparatus 520 may perform various functions to implement schemes, techniques, processes and methods described herein pertaining to MIMO joint ToA and AoA for Wi-Fi systems in wireless communications, including the various schemes described above with respect to various proposed designs, concepts, schemes, systems and methods described above as well as processes described below. For instance, apparatus 510 may be implemented in STA 110 and apparatus 520 may be implemented in STA 120, or vice versa.

Each of apparatus 510 and apparatus 520 may be a part of an electronic apparatus, which may be a non-AP STA or an AP STA, such as a portable or mobile apparatus, a wearable apparatus, a wireless communication apparatus or a computing apparatus. When implemented in a STA, each of apparatus 510 and apparatus 520 may be implemented in a smartphone, a smart watch, a personal digital assistant, a digital camera, or a computing equipment such as a tablet computer, a laptop computer or a notebook computer. Each of apparatus 510 and apparatus 520 may also be a part of a machine type apparatus, which may be an IoT apparatus such as an immobile or a stationary apparatus, a home apparatus, a wire communication apparatus or a computing apparatus. For instance, each of apparatus 510 and apparatus 520 may be implemented in a smart thermostat, a smart fridge, a smart door lock, a wireless speaker or a home control center. When implemented in or as a network apparatus, apparatus 510 and/or apparatus 520 may be implemented in a network node, such as an AP in a WLAN.

In some implementations, each of apparatus 510 and apparatus 520 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 510 and apparatus 520 may be implemented in or as a STA or an AP. Each of apparatus 510 and apparatus 520 may include at least some of those components shown in FIG. 5 such as a processor 512 and a processor 522, respectively, for example. Each of apparatus 510 and apparatus 520 may further include one or more other components not pertinent to the proposed scheme of the present disclosure (e.g., internal power supply, display device and/or user interface device), and, thus, such component(s) of apparatus 510 and apparatus 520 are neither shown in FIG. 5 nor described below in the interest of simplicity and brevity.

In one aspect, each of processor 512 and processor 522 may be implemented in the form of one or more single-core processors, one or more multi-core processors, one or more RISC processors or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including those pertaining to MIMO joint ToA and AoA for Wi-Fi systems in wireless communications in accordance with various implementations of the present disclosure.

In some implementations, apparatus 510 may also include a transceiver 516 coupled to processor 512. Transceiver 516 may include a transmitter capable of wirelessly transmitting and a receiver capable of wirelessly receiving data. In some implementations, apparatus 520 may also include a transceiver 526 coupled to processor 522. Transceiver 526 may include a transmitter capable of wirelessly transmitting and a receiver capable of wirelessly receiving data. It is noteworthy that, although transceiver 516 and transceiver 526 are illustrated as being external to and separate from processor 512 and processor 522, respectively, in some implementations, transceiver 516 may be an integral part of processor 512 as a system on chip (SoC), and transceiver 526 may be an integral part of processor 522 as a SoC.

In some implementations, apparatus 510 may further include a memory 514 coupled to processor 512 and capable of being accessed by processor 512 and storing data therein. In some implementations, apparatus 520 may further include a memory 524 coupled to processor 522 and capable of being accessed by processor 522 and storing data therein. Each of memory 514 and memory 524 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 514 and memory 524 may include a type of read-only memory (ROM) such as mask ROM, programmable ROM (PROM), erasable programmable ROM (EPROM) and/or electrically erasable programmable ROM (EEPROM). Alternatively, or additionally, each of memory 514 and memory 524 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 510 and apparatus 520 may be a communication entity capable of communicating with each other using various proposed schemes in accordance with the present disclosure. For illustrative purposes and without limitation, a description of capabilities of apparatus 510, as STA 110, and apparatus 520, as STA 120, is provided below in the context of example process 600. It is noteworthy that, although a detailed description of capabilities, functionalities and/or technical features of either of apparatus 510 and apparatus 520 is provided below, the same may be applied to the other of apparatus 510 and apparatus 520 although a detailed description thereof is not provided solely in the interest of brevity. It is also noteworthy that, although the example implementations described below are provided in the context of WLAN, the same may be implemented in other types of networks.

Illustrative Processes

Figure 6:
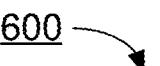
FIG. 6 is a flowchart of an example process in accordance with an implementation of the present disclosure.
Figure 6:
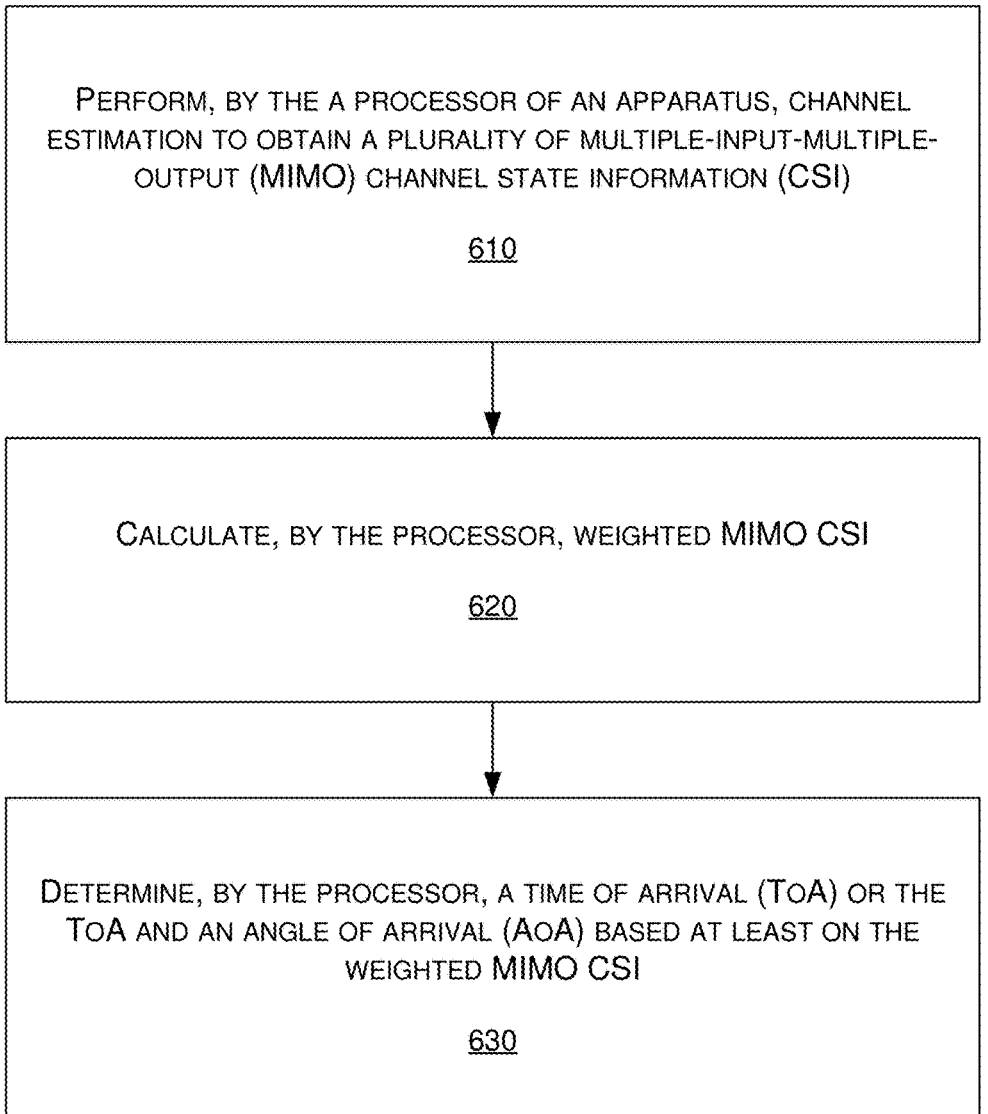

FIG. 6 illustrates an example process 600 in accordance with an implementation of the present disclosure. Process 600 may represent an aspect of implementing various proposed designs, concepts, schemes, systems and methods described above. More specifically, process 600 may represent an aspect of the proposed concepts and schemes pertaining to MIMO joint ToA and AoA for Wi-Fi systems in wireless communications in accordance with the present disclosure. Process 600 may include one or more operations, actions, or functions as illustrated by one or more of blocks 610, 620 and 630. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively, in a different order. Furthermore, one or more of the blocks/sub-blocks of process 600 may be executed repeatedly or iteratively. Process 600 may be implemented by or in apparatus 510 and apparatus 520 as well as any variations thereof. Solely for illustrative purposes and without limiting the scope, process 800 is described below in the context of apparatus 510 implemented in or as STA 110 functioning as an AP STA or a non-AP STA and apparatus 520 implemented in or as STA 120 functioning as a non-AP STA or an AP STA of a wireless network such as a WLAN in network environment 100 in accordance with one or more of IEEE 802.11 standards. Process 600 may begin at block 610.

At 610, process 600 may involve processor 512 of apparatus 510, performing, via transceiver 516, channel estimation to obtain a plurality of MIMO CSI. Process 600 may proceed from 610 to 620.

At 620, process 600 may involve processor 512 calculating weighted MIMO CSI. Process 600 may proceed from 620 to 630.

At 630, process 600 may involve processor 512 determining a ToA or the ToA and an AoA based at least on the weighted MIMO CSI.

In some implementations, in calculating the weighted MIMO CSI, process 600 may involve processor 512, for each MIMO CSI of the plurality of MIMO CSI: (a) calculating a weighting factor; and (b) applying the weighting factor to the respective MIMO CSI.

In some implementations, in calculating the weighting factor, process 600 may involve processor 512 calculating the weighting factor based on at least one of a SINR, an RSSI and an RMSD.

In some implementations, in applying the weighting factor, process 600 may involve processor 512: (a) responsive to a respective SINR of the respective MIMO CSI being lower than a SNR threshold, de-weighting the respective MIMO CSI; or (b) responsive to the respective SINR being equal to or higher than the SNR threshold, applying a predetermined weighting factor to the respective MIMO CSI.

In some implementations, in determining the ToA or the ToA and the AoA based at least on the weighted MIMO CSI, process 600 may further involve processor 512, for each MIMO CSI of the plurality of MIMO CSI: (a) calculating a subcarrier or subband validation mask; (b) combining the weighted MIMO CSI and the subcarrier or subband validation mask; and (c) determining the ToA or the ToA and the AoA based on the combined weighted MIMO CSI and the subcarrier or subband validation mask.

In some implementations, in calculating the subcarrier or subband validation mask, process 600 may involve processor 512 calculating the subcarrier or subband validation mask based on either or both of a respective SINR and a respective noise profile associated with a respective subcarrier or subband.

In some implementations, in combining the weighted MIMO CSI and the subcarrier or subband validation mask, process 600 may involve processor 512 disregarding the subcarrier or subband validation mask responsive to a respective SINR associated with a respective subcarrier or subband being higher than a SINR threshold.

In some implementations, in determining the ToA or the ToA and the AoA, process 600 may involve processor 512 iteratively extracting a channel impulse response (CIR) from the plurality of MIMO CSI to search the ToA or the ToA and the AoA.

In some implementations, in iteratively extracting the CIR from the plurality of MIMO CSI to search the ToA or the ToA and the AoA, process 600 may involve processor 512, during each iteration: (a) searching for one or more new possible tap candidates for each of one or more candidates; (b) cancelling one or more peak components individually; (c) keeping one or more most possible candidates to a next iteration; and (d) checking whether any of the one or more most possible candidates passes termination criteria.

In some implementations, process 600 may further involve processor 512 performing, via transceiver 516, two-way ranging with the ToA or the ToA and the AoA.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

performing, by a processor of an apparatus, channel estimation to obtain a plurality of multiple-input-multiple-output (MIMO) channel state information (CSI);

calculating, by the processor, weighted MIMO CSI; and determining, by the processor, a time of arrival (ToA) or the ToA and an angle of arrival (AoA) based at least on the weighted MIMO CSI, wherein the calculating of the weighted MIMO CSI comprises, for each MIMO CSI of the plurality of MIMO CSI:

calculating a weighting factor; and applying the weighting factor to the respective MIMO CSI, wherein the calculating of the weighting factor comprises calculating the weighting factor based on at least one of a signal-to-interference-and-noise ratio (SINR), a received signal strength indicator (RSSI) and a root-mean-square deviation (RMSD), wherein the applying of the weighting factor comprises:

responsive to a respective SINR of the respective MIMO CSI being lower than a signal-to-noise ratio (SNR) threshold, de-weighting the respective MIMO CSI; or responsive to the respective SINR being equal to or higher than the SNR threshold, applying a predetermined weighting factor to the respective MIMO CSI.

2. A method, comprising:

performing, by a processor of an apparatus, channel estimation to obtain a plurality of multiple-input-multiple-output (MIMO) channel state information (CSI);

calculating, by the processor, weighted MIMO CSI; and determining, by the processor, a time of arrival (ToA) or the ToA and an angle of arrival (AoA) based at least on the weighted MIMO CSI, wherein the determining of the ToA or the ToA and the AoA based at least on the weighted MIMO CSI further comprises, for each MIMO CSI of the plurality of MIMO CSI:

calculating a subcarrier or subband validation mask;

combining the weighted MIMO CSI and the subcarrier or subband validation mask; and determining the ToA or the ToA and the AoA based on the combined weighted MIMO CSI and the subcarrier or subband validation mask.

3. The method of claim 2, wherein the calculating of the subcarrier or subband validation mask comprises calculating the subcarrier or subband validation mask based on either or both of a respective signal-to-interference-and-noise ratio (SINR) and a respective noise profile associated with a respective subcarrier or subband.

4. The method of claim 2, wherein the combining of the weighted MIMO CSI and the subcarrier or subband validation mask comprises disregarding the subcarrier or subband validation mask responsive to a respective signal-to-interference-and-noise ratio (SINR) associated with a respective subcarrier or subband being higher than a SINR threshold.

5. The method of claim 1, wherein the determining of the ToA or the ToA and the AoA comprises iteratively extracting a channel impulse response (CIR) from the plurality of MIMO CSI to search the ToA or the ToA and the AoA.

6. The method of claim 5, wherein the iteratively extracting of the CIR from the plurality of MIMO CSI to search the ToA or the ToA and the AoA comprises, during each iteration:

searching for one or more new possible tap candidates for each of one or more candidates;

cancelling one or more peak components individually;

keeping one or more most possible candidates to a next iteration; and checking whether any of the one or more most possible candidates passes termination criteria.

7. The method of claim 1, further comprising:

performing, by the processor, two-way ranging with the ToA or the ToA and the AoA.

8. An apparatus, comprising:

a transceiver configured to communicate wirelessly; and a processor coupled to the transceiver and configured to perform operations comprising:

performing, via the transceiver, channel estimation to obtain a plurality of multiple-input-multiple-output (MIMO) channel state information (CSI);

calculating weighted MIMO CSI; and determining a time of arrival (ToA) or the ToA and an angle of arrival (AoA) based at least on the weighted MIMO CSI, wherein the determining of the ToA or the ToA and the AoA comprises iteratively extracting a channel impulse response (CIR) from the plurality of MIMO CSI to search the ToA or the ToA and the AoA, wherein the iteratively extracting of the CIR from the plurality of MIMO CSI to search the ToA or the ToA and the AoA comprises, during each iteration:

searching for one or more new possible tap candidates for each of one or more candidates;

cancelling one or more peak components individually;

keeping one or more most possible candidates to a next iteration; and checking whether any of the one or more most possible candidates passes termination criteria.

9. The apparatus of claim 8, wherein the calculating of the weighted MIMO CSI comprises, for each MIMO CSI of the plurality of MIMO CSI:

calculating a weighting factor; and applying the weighting factor to the respective MIMO CSI.

10. The apparatus of claim 9, wherein the calculating of the weighting factor comprises calculating the weighting factor based on at least one of a signal-to-interference-and-noise ratio (SINR), a received signal strength indicator (RSSI) and a root-mean-square deviation (RMSD).

11. The apparatus of claim 10, wherein the applying of the weighting factor comprises:

responsive to a respective SINR of the respective MIMO CSI being lower than a signal-to-noise ratio (SNR) threshold, de-weighting the respective MIMO CSI; or responsive to the respective SINR being equal to or higher than the SNR threshold, applying a predetermined weighting factor to the respective MIMO CSI.

12. The apparatus of claim 8, wherein the determining of the ToA or the ToA and the AoA based at least on the weighted MIMO CSI further comprises, for each MIMO CSI of the plurality of MIMO CSI:

calculating a subcarrier or subband validation mask;

combining the weighted MIMO CSI and the subcarrier or subband validation mask; and determining the ToA or the ToA and the AoA based on the combined weighted MIMO CSI and the subcarrier or subband validation mask.

13. The apparatus of claim 12, wherein the calculating of the subcarrier or subband validation mask comprises calculating the subcarrier or subband validation mask based on either or both of a respective signal-to-interference-and-noise ratio (SINR) and a respective noise profile associated with a respective subcarrier or subband.

14. The apparatus of claim 12, wherein the combining of the weighted MIMO CSI and the subcarrier or subband validation mask comprises disregarding the subcarrier or subband validation mask responsive to a respective signal-to-interference-and-noise ratio (SINR) associated with a respective subcarrier or subband being higher than a SINR threshold.

15. The apparatus of claim 8, wherein the processor is further configured to perform operations comprising:

performing, via the transceiver, two-way ranging with the ToA or the ToA and the AoA.

* * * * *